E. A. NEWMAN
M. A. WRIGHT
Inventors
By Stevens, Davis, Miller & Mosher
Attorneys

ELECTRONIC DIGITAL COMPUTERS

Original Filed Oct. 17, 1955

E. A. NEWMAN
M. A. WRIGHT
Inventors
By Stevens, Davis, Miller & Mosher
Attorneys

ELECTRONIC DIGITAL COMPUTERS

Original Filed Oct. 17, 1955

4 Sheets-Sheet 3

E. A. NEWMAN
M. A. WRIGHT
Inventors
By Stevens, Davis, Miller & Mosher
Attorneys

ELECTRONIC DIGITAL COMPUTERS

Original Filed Oct. 17, 1955 4 Sheets-Sheet 4

E. A. NEWMAN
M. A. WRIGHT
Inventors
By Stevens, Davis, Miller + Mosher
Attorneys United States Patent Office 3,277,447

Patented Oct. 4, 1966

3,277,447
ELECTRONIC DIGITAL COMPUTERS

Edward Arthur Newman, Oxshott, Surrey, and Michael Arthur Wright, Cheam, Surrey, England, assignors, by mesne assignments, to International Business Machines Corporation, New York, N.Y., a corporation of New York Continuation of application Ser. No. 326,276, Nov. 26, 1963, which is a continuation of application Ser. No. 849,198, Oct. 28, 1959, which in turn is a continuation of application Ser. No. 540,876, Oct. 17, 1955. This application Mar. 18, 1964, Ser. No. 353,212

Claims priority, application Great Britain, Oct. 22, 1954, 30,442/54

35 Claims. (Cl. 340—172.5)

The present invention relates to electronic digital computers whose computing operations are controlled by groups of digit signals called instruction words which direct the passage of numbers represented by groups of digit signals called number words between various parts of the computer whereby they undergo various transformations in the course of a computing operation. This application is a continuation of our copending application Ser. No. 326,276, filed November 26, 1963, now abandoned, which in turn was a continuation of S.N. 849,198, filed October 28, 1959, now abandoned, which itself was a continuation of S.N. 540,876, filed October 17, 1955, now abandoned, having a priority date of October 22, 1954, in British application 30,442/54.

A single instruction word in any computer of this type must in general specify the transfer of at least one number word from one storage location acting as a source on this occasion to another storage location acting as a destination on this occasion in the course of which it may or may not be modified. In prior arrangements, either the address of the source and destination is specified or the address of either the source or destination is specified where the other is known (because it is a special location such as an accumulator or register which is automatically involved in any transfer). In more complex prior arrangements, transfers of two words can be ordered by a single instruction word from specified sources to specified destinations, and in addition the next instruction word may be specified by the adddess of its location. Instruction words of this type are used, for example, in digital computers having instruction control arrangements as described in patent application Serial No. 290,014, filed May 26, 1952, by Edward A. Newman, et al. now Patent No. 2,891,723.

In these prior arrangements, a word which has been transferred to a new location must then be specified by the address of its new location, and thus the computer operator or programmer must be fully aware of the operation of the computer in order to construct a programme. This is not desirable in the case of a digital computer which is required to be used easily by a considerable number of different people for relatively simple computations and it is an object of the present invention to provide a relatively direct and straightforward interpretation of computing operations.

A basic feature of the present invention lies in the division of each number word into two parts, one part having a first group of digits forming a label or tag which identifies the number word and the other part having a second group of digits which is the number itself. As a result, number words can be made to identify themselves wherever they are by the permutation of a certain group of their own digit signals constituting a tag. Hence, no account has to be taken by the programmer of the location or changes of location of any number word. In addition, number words can be fed into the computer in any order and be effectively stored. That is, the machine carries out its own sorting of data or information. This facility is particularly useful in computing machines used for general business purposes.

The instruction words in a computer according to the invention may be composed of groups of digit signals which correspond directly to orders as actually conceived mentally by the operator. For example, in a three-address code computer, an operation in the form, "multiply A by B to give a product C," would be ordered by an instruction word which contains a first group of digit signals which correspond to the tag A of the required multiplicand number, a second group corresponding to the tag B of the required multiplier, a third group calling for the multiplication operation, a fourth group consisting of the tag C with which the product is to be labelled. As a result, a whole series of computing operations can be ordered by instruction words which are in a form corresponding directly with an algebraic statement of each step.

In these prior digital computers in which a group of digit signals in the instruction word specifies the address of the storage location of the required number word, this group of digit signals is used to control by means of tree circuits in a well-known manner the input and output gates of the various storage locations in the computer, so that the number word in a particular location can be replaced or read out when the group of digit signals is in a particular form.

In computers having tagged words in accordance with the present invention and in which tagged number words may be located in accordance with a free interchange arrangement in any one of the various storage locations of the computer, tree circuits cannot in these circumstances be used to locate the required word and the tag of every number word in the computer would have to be examined until the word with the required tag was found. If this examination were carried out in a serial manner, it would take up a considerable period of time while if all the number words or groups of number words were examined in parallel simultaneously, a considerable quantity of equipment would be required.

The equipment and/or time required to make a tagged number available can, in accordance with a feature of the invention, be reduced by incorporating practically all the storage locations of the computer in two separate storage arrangements, one of these storage arrangements being a main store having most of the storage locations and the other being a temporary store having a few storage locations in which number words which are likely to be required are accumulated; arrangements being made to search through the temporary store for a required number word before the main store is searched through.

The number words which are most likely to be required during the course of the next set of computing operations are usually those which have taken part in recent computing operations and so the average time taken to find a required number word is reduced by retaining words used in a computing operation in the temporary store as long as is convenient.

The main store equipment required may be simplified by arranging in accordance with a further feature of the invention, for each number word in the main store to be stored in a storage location having an address which is equivalent to the group of digit signals making up the tag or label of the number word, that is, each number word stored in the main store is stored in a location whose address corresponds to its tag As a result, number words can be located in the main store by selecting the storage locations whose address corresponds to the tag of the number word by means of tree circuits in a manner similar to that employed in existing computers.

The invention and various further features of the invention will be described in the course of the following description by way of example of a single address code serial mode binary digital computer.

This description refers to the accompanying drawings of which:

FIGURE 2 is a schematic diagram of the layout of an instruction word employed in the computer;

FIGURES 3 and 4 are logical circuit diagrams of parts of the computer shown in FIGURE 1; while

Figure 1:
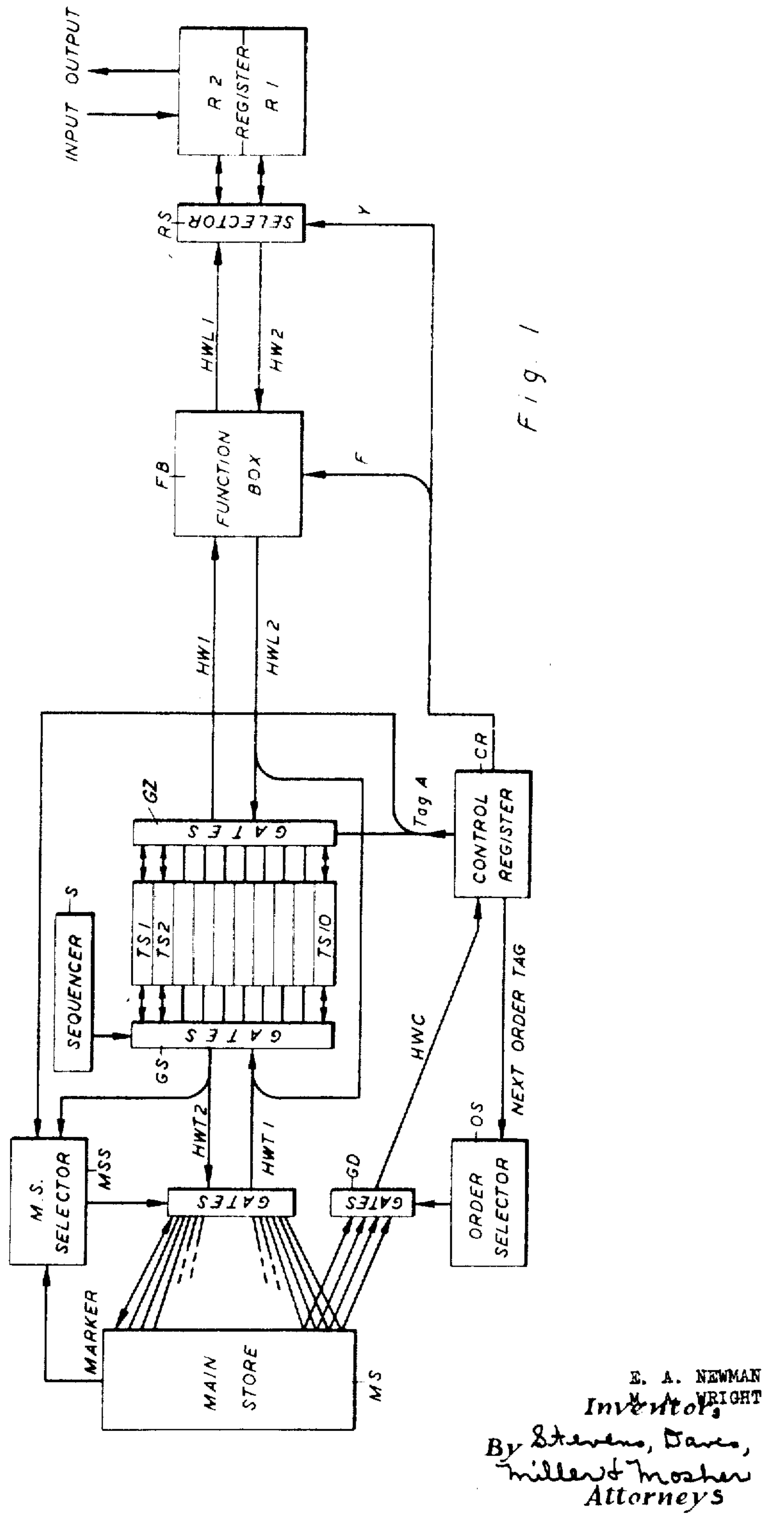
FIGURE 1 is a general schematic diagram of the computer.

Various circuit elements in the drawings are represented in accordance with the Turing notation as described in patent specification No. 2,686,632. Each digit signal is allocated a digit period of fixed duration in a temporal sequence and both instruction and number words consist of serial trains of 48 digit signals occupying minor cycles of 48 digit periods duration. The $n$th digit signal in a word occupies digit period $n$ and will be referred to as a digit signal $n$. Each digit signal is either a one when a voltage pulse occurs during the digit period or is a zero when no pulse is present.

As shown in FIGURE 1, the essential parts of a computing machine in acordance with the invention are a main store MS, a battery of ten temporary stores TS1 to TS10 arranged in parallel, a function box FB in which the various computing operations are performed, a register which consists of two individual registers R1 and R2, and a control register CR which controls the operation of the machine.

The main store MS is a magnetic recording drum which stores digit signals as magnetisation patterns arranged in 32 parallel tracks. Each track stores 32 words so that the capacity of the main store is 1024 words. The access-time of the main store is, of course, long (up to 32 minor cycles where reading can take place at one position only around the drum). Each temporary store TS1 to TS10 is an immediate access store storing a single word and is preferably a magneto-strictive nickel delay line.

As previously described, each number word consists of 48 digit signals of which a group forms a tag or label which identifies the number word and the remaining digit signals make up the number itself. In the machine being described, a group of ten digits out of the first 16 constitute the tag while the last 32 digits make up the number itself.

When a word is ordered to be read from the storage system of the machine and transferred to the function box FB to take part in a computing operation, its tag is searched for simultaneously in all the temporary stores and if not found, its tag is searched for in the main store. To save time the search for the tag in the main store is arranged to commence as soon as possible and be automatically stopped if and when the tag is found in a temporary store. Number words are stored in any order in the temporary stores but this is no disadvantage as a simultaneous search is made through those stores. In accordance with a feature of the invention already referred to, the number words are stored in locations in the main store whose addresses are identical with the tags of the number words. As a result, the search for a tag is reduced to a straight-forward search for an address in a known position.

When a required number word has been found in the main store MS in a manner which will be described in greater detail later, it is passed to one of the temporary stores TS1 to TS10 for onward transmission along the signal highway HW1 to the function box FB, there being no direct path from the main store to the function box which does not pass through one of the temoprary stores. Once a number word has been called on to take part in a computing operation, it will be located in one of the temporary stores and is readily available for further use. This leads to a considerable saving of time as numbers are often required several times during a stage in a computation.

The particular temporary store TS1 to TS10 to which a number word called from the main store MS is transferred is selected by a sequencer S which controls the gates GS to the temporary stores in such a manner that the gate to one temporary store is open in turn in cyclic order. The change from one gate to the next is made between transfers so that number words are transferred to different stores and are not written over in the temporary store to which they have been sent until ten number words have been transferred. By this time, it is likely that they are no longer required.

However, some number words stored in the temporary stores will be new numbers derived from the computing process and so are not already stored in the main store MS. As it is essential that these numbers are preserved, the number word occupying a temporary store is transferred to the main store before a number word is transfered to that temporary store unless the tags of these two words are identical. This is accomplished by passing the tag of the word occupying the temporary store selected by the sequencer S to a main store selector MSS which opens the input gate to the main store MS when the location in the main store whose address corresponds to the tag being examined by the selector MSS is available to be written into. The contents of the selected temporary store are thereupon transferred to this storage location in the main store via the signal highway HWT2, and the tag of the number word required by the function box FB is then passed to the selector MSS which then acts to open the output gates from the main store MS to permit the required number word to pass along the signal highway HWT1 to the temporary store selected by the sequencer S.

As shown in FIGURE 1, number words can be passed from the temporary stores to the function box FB along the signal highway HW1 and can be returned along the signal highway HWL2. When a number word is required to be passed to one of the temporary stores TS1 to TS10 from the function box FB the tag of the number word is searched for as already described in the case of a read transfer from the temporary stores to the function box. If the tag is found in one of the temporary stores TS1 to TS10 that store is opened to receive through the gates GZ the number word which is thus directly written into the temporary store.

If this number word is not found in a temporary store TS1 to TS10, then the contents of the temporary store chosen by the sequencer S as previously described are transferred to the main store MS and the number word is then transferred to this vacant temporary store through the gates GS controlled by the sequencer S.

Number words can also be passed from the function box FB along a signal highway HWL1 to either one of two single word special registers R1 and R2 as selected by a selector RS, and returned from these registers along a highway HW2. The registers R1 and R2 serve as useful adjuncts to the function box FB in storing number words which are actually engaged in a computing operation.

In addition, words are passed into and read from the machine through the register R2.

The whole operation of the computing machine is controlled by the control register CR which is the heart of the instruction control circuits and is itself operated by a series of instruction words called hereafter, order words, each of which is delivered from the main store MS along a control highway HWC under the direction of the previous order word. The order words are stored in the main store MS in the same manner as ordinary numbe words, but as fewer order words than number words are required during a computation, they are confined to a section of the main store. In the machine being described in which the magnetic recording drum main store has 32 tracks, available for storing number words, eight of these tracks are made available for storing order words. This arrangement enables the number of gates GD from the main store MS to the control highway HWC to be reduced.

As shown in FIGURE 1, words stored on the eight tracks of the main store MS on which order words can be stored can be read out to the temporary stores. Thus order words can be modified in the function box FB and in the description where number words are referred to they may be order words which are at the time undergoing modifications as if they were ordinary number words.

The 48 digits in each order word perform the functions indicated in FIGURE 2 and are used in the following manner. The tag *n* of the order word itself (digits 3 to 10) is used to identify the order word in the main store MS so that it can be transferred to the control register CR. The tag A (digits 17 to 26) the tag-defining group which is the tag of the number word to be operated on is stored in the control register and is applied to the temporary store gates GZ and to the main store selector MSS in order to select the operand number if required. The tag N (digits 29 to 36) of the next order word to be obeyed is delivered to the next order selector OS so that selection of the next order word in the main store can take place. The function digits (digits 41 to 48) comprise a group of five digits F (digits 43 to 47) which are applied to a function tree from which 32 outputs, referred to in the specification as T0 to T31, are available for controlling the operation of the function box FB and various other parts of the machine, the stop digit S (digit 41) which is used to stop the machine, the Y digit (digit 42) which is applied to the selector RS to specify whether the register R1 or the register R2 is to be used in the pending operation, and the X digit (digit 48) which is applied to the temporary storage circuits to determine whether the selected operand is to be written into or read from one of the temporary stores.

In addition to the equipment shown in FIGURE 1, the machine contains a clock pulse generator which produces a continuous series of clock pulses which define the digit periods, and a P pulse generator which produces 16 P pulse outputs, the first being a P1 output consisting of a one type digit pulse during digit period "1" of each minor cycle, the second being a P2 output consisting of a pulse during each digit period "2" and so on for the remaining outputs, P3 to P16.

Figure 3:
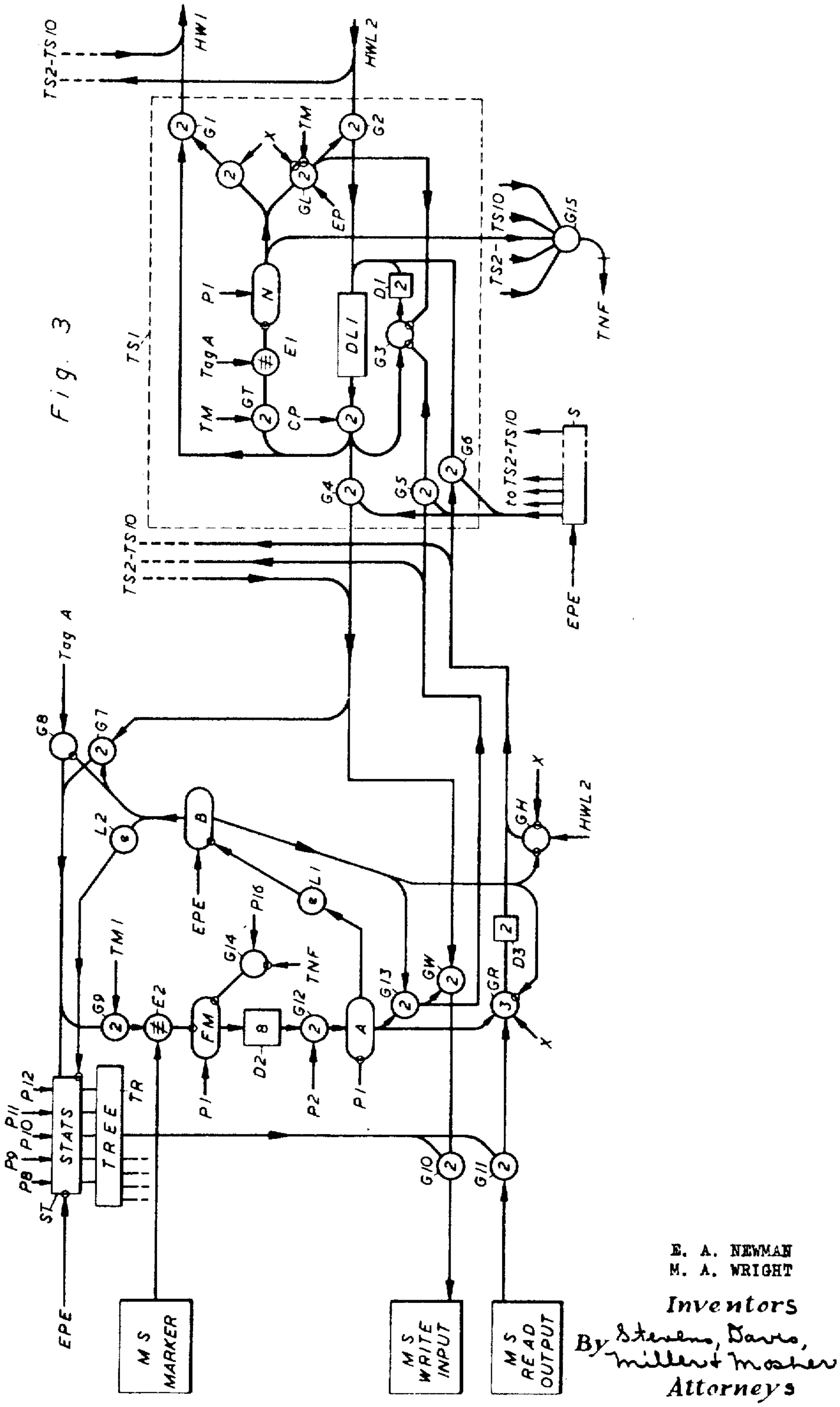

The operation of the computer will now be described in greater detail with reference to FIGURE 3 which is a detailed logical diagram of the temporary and main store interconnections. Only one temporary store TS1 is shown, and described, the other temporary stores TS2–TS10 having similar circuits which operate in parallel and input and output circuits which join those shown for the temporary store TS1 at the places indicated. The temporary store TS1 consists essentially of a delay line store DL1, which may be a magneto-strictive nickel delay line, and which has a circulation loop having a total delay time of one minor cycle. The timing and shape of the circulating digit signals is corrected by clock pulses CP in a well known manner.

As previously described, the temporary stores TS1 to TS10 are involve in the carrying out of an order which calls for an operand from the temporary or main stores or requires the transfer of an operand to these stores. In either case, the operand is immediately searched for in the temporary stores in the following manner.

Figure 5:
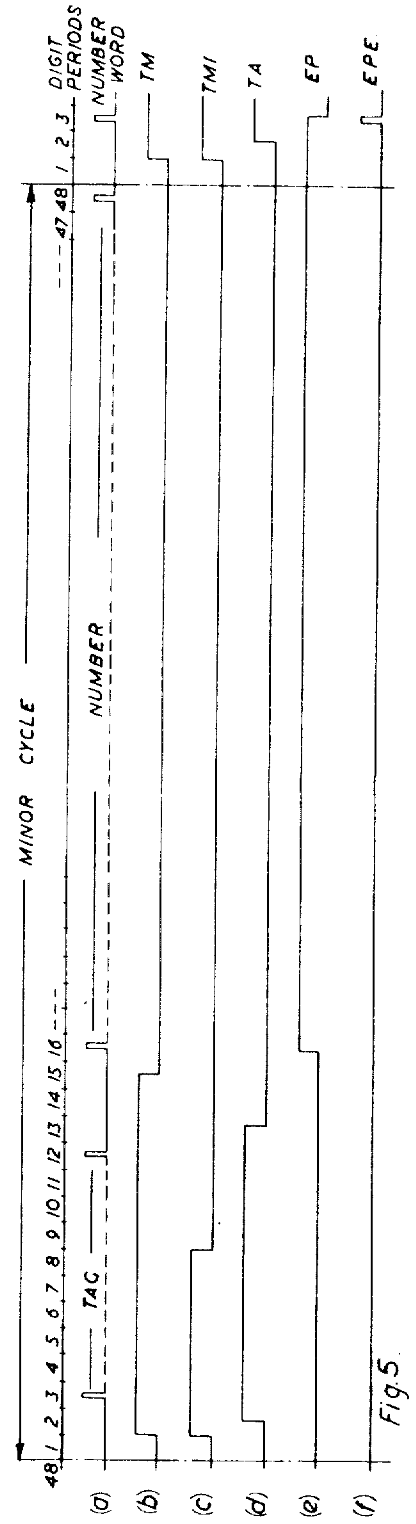
FIGURE 5 shows for a number word the voltage waveform occurring at various parts of the circuits shown in FIGURES 3 and 4.

As previously described and as shown in FIGURE 5(*a*), digit signals 3 to 12 in each word make up the tag of the word and so the output of a gate GT (FIG. 3) in the temporary store TS1 and controlled by TM pulses as shown in FIGURE 5(*b*), consists of the tag of the stored word bereft of the number digits. This output is compared in the not-equivalent gate E1 with the tag A (argument) of the required operand which is applied from the control register CR.

The output of the gate E1 is applied to the trigger N which is put on (if it is not so already) at the beginning of each minor cycle by a P1 pulse with the result that the trigger N will still be on during digit periods 15 to 48 only if the tag of the word in the store is the same as tag A. When this is so, if the order requires the operand word to be read out of the temporary store so that the X output (from the X trigger as later described with reference to FIGURE 4) is on, the output gate G1 is opened and the word stored in the temporary store TS1 is allowed to pass along the highway HW1 to the function box FB. The required period of transfer is controlled by an input gate in the function box FB.

Similarly, if the operand is to be written into the temporary store the X output is off and the output from the gate GL controlled by the EP output as shown in FIGURE 5(*e*) opens the input gate G2 to admit the word from the highway HWL2 to the store. The word already there is replaced as the gate G3 is closed at the same time by the output from the gate GL but no wanted number is lost as the replaced number is a number which is required to supersede the original during the remaining steps of the computation.

If the required operand is not present in any one of the temporary stores TS1 to TS10 and is required to be delivered to the function box FB then it must be saerched for in the main store MS, transferred to a selected one of the temporary stores and thence passed on to the function box in a manner already described. Also, as previously described, it is necessary, in order to make sure that no number word is destroyed, to transfer the word in the selected temporary store to its appropriate storage position in the main store MS before the required operand is delivered from the main store.

These operations are carried out in the following manner. The temporary store to be involved in the transfer operation is selected by the sequencer S which is a circuit having ten outputs, each one of which is used to control three gates in a corresponding temporary store as shown for gates G4, G5, and G6 for the temporary store TS1. Only one output from the sequencer S is on at a time so that only one temporary store in turn is connected to the main store.

Figures 2, 4:
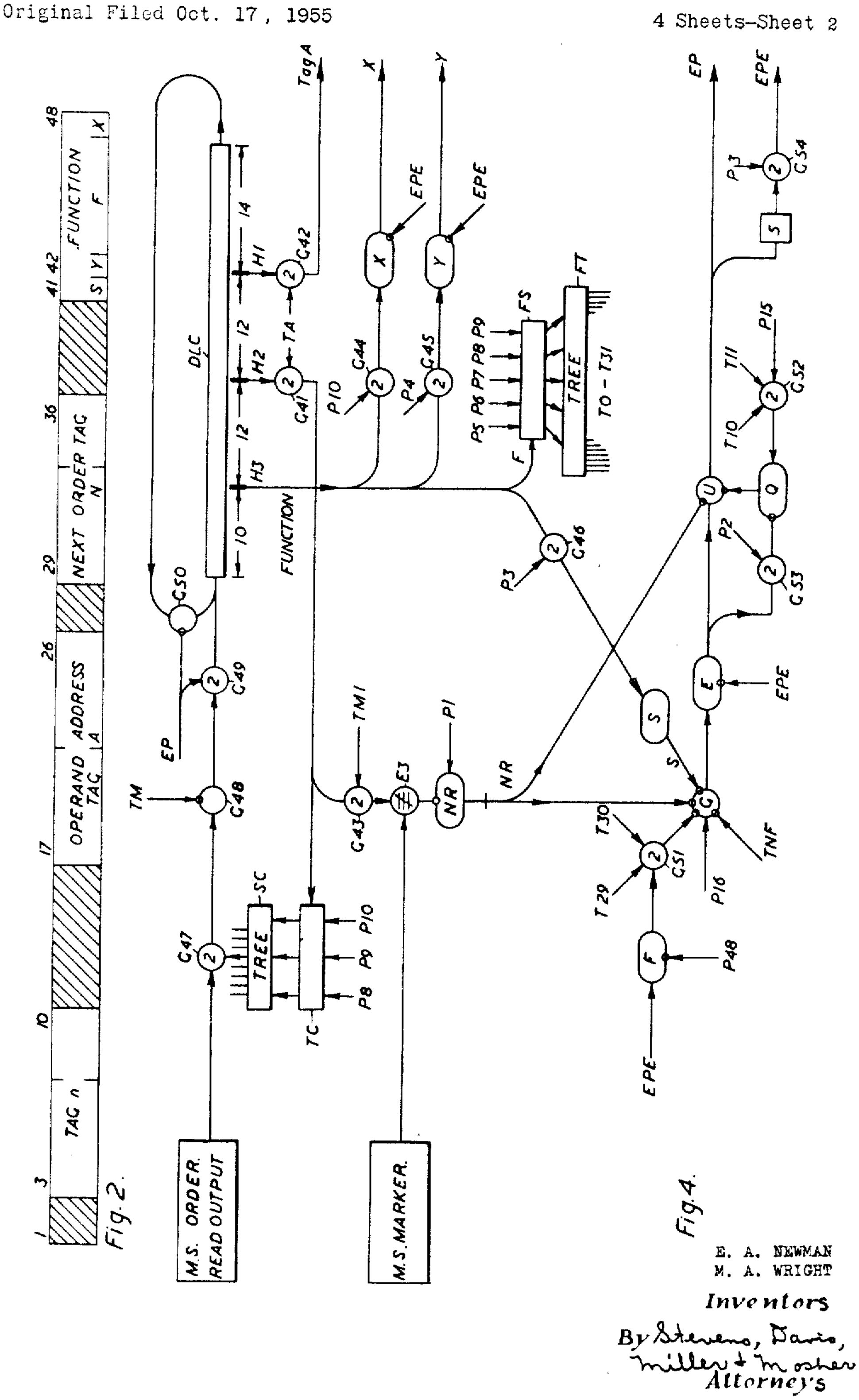

The ON output is stepped on one when the circuits are ready to obey a new control word by the pulse input EPE from the control register CR which is described more fully in connection with FIGURE 4. The sequencer S may employ a cold cathode switching tube having a common central anode and ten cathodes each having a separate output connection, such as the tube sold in the United Kingdom under the trade designation GS10C. The switching tube also has two transfer electrodes to which the input EPE in negative-going pulse form is applied with the effect that the current discharge path between a cathode and the anode is repeatedly shifted onto the next cathode. The setting up of a discharge on a cathode causes a voltage pulse on its output connection which is applied to the corresponding temporary store TS1 to TS10. It will be assumed that the output to the temporary store TS1 is on during the present transfer.

The read and write gates GR and GW of the main store MS, are normally closed as the trigger A is put off if it is not so already at the beginning of each minor cycle by a P1 pulse. The trigger B, however, has been put on at the end of the previous transfer operation by an EPE pulse as described later in connection with FIGURE 4 and so the word in the delay line DL1 is passed through the gate G7. Digit signals 8–12 are staticised in the staticisor ST and digit signals 3–7 are passed through the gate G9 which is controlled by TM1 pulses as shown in FIGURE 5(*c*). These digit signals 3–12 make up the tag of the number word as shown in FIGURE 5(*a*), and of these digit signals 8–12 (FIG. 3) are used to produce an output on one of the 32 output connections from the tree TR. Each of these output connections control input and output gates, such as the gates G10 and G11, of a particular recording track on the magnetic drum main store so that the digit signals 8–12 of a tag are used to select the particular track upon which this word is stored.

The position on the track on which the word is stored is found by comparing in the not-equivalent gate E2 the digit signals 3–7 of the tag as they repeatedly emerge in serial form from the gate G9 with successive groups of five digit signals read from the main store marker track. These groups of digit signals read from the marker track are the track section parts of the main store addresses. The output of the gate E2 is fed to an inhibiting connection of a trigger FM which is put on at the beginning of each minor cycle so that only if the digits 3–7 of the tag and the track section address agree completely is the trigger FM still on for the rest of the minor cycle following digit period 13. The output of the trigger FM is passed through a delay unit D2, which imposes a delay of about eight digit periods, to a gate G12 controlled by P2 pulses so that the gate G12 produces an output only during digit period 2 of the minor cycle following that in which equivalence between the track marker and the tag A is established. This output is applied to the transfer timing trigger A, which is thus put on and remains on for the whole of this minor cycle following digit period 2, until it is put off at the beginning of the next minor cycle by a P1 pulse.

It will be appreciated that these circuits so far described will operate as soon as the previous transfer operation is terminated and the trigger B is put on (and hence the gate G7 is opened) by the EPE pulse produced at this time. This is desirable in order to not waste time if the required word for the pending transfer is not found in a temporary store. However, it is necessary, as soon as it is established that the required word is present in a temporary store, to inhibit any transfer directed by the main store selector circuits MSS as a result of the required track section address being found.

This inhibiting action is performed by combining the inverse outputs from the various triggers N in all the temporary stores TS1–TS10 through a gate G15. The inverse output from this gate is a tag not found TNF output which is thus on after digit period 13 in a minor cycle if the tag has not been found and no trigger N is thus still on at this time. This TNF output is applied to a gate G14 (FIG. 3) to inhibit the application of a P16 pulse to an inhibiting input to the trigger FM so that until the word is found in a temporary store the main store selector circuits function. As soon as the word is found in a temporary store the TNF output goes off and the trigger FM is put off if it is still on by a P16 pulse from the gate G14. As a result, the transfer timing trigger A cannot be put on at this time and the transfer of the required word from a temporary store is not interfered with.

The effect of trigger A being put on for a minor cycle (the required word not having been found in a temporary store) will now be described. As the trigger B has been on since the end of the previous transfer, gates GR and GH are closed, but a gate G13 is open. The write transfer gate GW is consequently opened for a minor cycle so that the contents of the temporary store TS1 is transferred to the main store write input through the gate G10 (FIG. 3) of the track selected by the tree TR. The position of the main store write input is, of course, arranged to feed the contents of the temporary store TS1 into the correct storage section of the selected track. During this transfer minor cycle, the output from the gate G13 is applied through the gate G5 to close the gate G3 in the circulation loop of the delay line DL1 so that the temporary store TS1 is emptied in preparation for the receipt from the main store MS of the number word which is required to be the operand.

At the end of the transfer minor cycle the trigger B is put off through the action of an end element L1 and as a result, the staticisors ST are reset through the end elements L2 and the gate G7 is closed. A gate G8 is at the same time opened instead to permit the application of the tag A of the required operand to be applied from the control register CR to the staticisors ST and the not-equivalent gate E2 in place of the tag of the word stored in the selected temporary store TS1. In a manner similar to that already described for the transfer of this word from the temporary store TS1 the trigger A is put on for a transfer minor cycle when the required operand is in position to be read out by the main store read output through the gate G11 of the track selected by the tree TR. The trigger B is, however, off on this occasion and so while the gates G13, GW are closed, the read gate GR is open as the X output is on, and the required operand is transferred to the selected temporary store TS1.

At the end of this minor cycle, the trigger A is put off by a P1 pulse and no more action will take place until the next EPE pulse is produced. The presence of the required word in a temporary store (TSL in this case) is recognised during the following minor cycle, the transfer from the temporary store immediately follows and normally an EPE pulse is produced, restoring the main store selector circuits to their initial condition.

The transfer of a number word from the temporary storage system after it has been called from the main storage system, if this is necessary, has now been described. The transfer of a number word to the temporary storage system direct from the highway HWL2 has been described when the transfer has taken place through the gate G2 to the store which is already storing a word having the same tag as the word on the highway HWL2. If no such tag is found, no gate G2 can be opened and the transfer cannot take place until a temporary store selected by the sequencer S has been cleared of the number word it has been storing by a procedure which has already been fully described. That is, the number word in the selected temporary store, which is assumed to be store TS1 again for convenience, is transferred during the minor cycle that the trigger A is on to a position in the main store MS through the write gate GW, the store TS1 being cleared at the same time by the closing of the gate G3.

As a write transfer into a temporary store is ordered, the X output is a zero and so when the trigger B is put off and the temporary store TS1 has been cleared, the gate R remains closed but a gate GH is opened to permit the word to be transferred from the highway HWL2 (FIG. 3) to the selected temporary store TS1 through the gate G6. This transfer is terminated at the beginning of the next transfer operation by the putting on of the trigger B by an EPE pulse which is produced in a manner which will be described with reference to FIGURE 4.

Two delay units D1 and D3 (FIG. 3) are included in the circuits to enable digit signals applied from the highway HWL2 to be fed to the delay lines of the temporary stores two digit periods early compared with digit signals sent from the main store MS. This is to compensate for an inherent delay in the operation of the function box FB.

The instruction control circuits of the machine will be described with reference to FIGURE 4. These circuits correspond mainly to the control register CR, the order selector OS and the order gate GD of the main store MS, and the various control outputs from the control register CR.

The control register consists essentially of a minor cycle delay line store DLC which stores the present instruction or order word. The procedure by which this word directs a transfer operation is as follows. Three outputs are arranged along the delay line DLC, which is preferably a nickel magneto-strictive line, through heads H1, H2 and H3 which are 14, 26 and 38 digit periods as shown behind the head of the line. At the beginning of a minor cycle an order word is lying along the delay line, so that during digit period 3, digit signal 17 is emerging through the head H1, digit signal 29 is emerging through the head H2, while digit signal 41 is emerging through the head H3. Thus digit signals 17 to 26 will pass through the gate G42 controlled by TA pulses as shown in FIGURE 5(*d*) so that the output from the gate G42 is the operand address tag A which is applied to the gates E1 and G8 in the circuits shown in FIGURE 3. Similarly, digit signals 29 to 36 will pass through the gate G41 controlled by TA pulses so that the output from this gate is the next order tag N which is applied to the order selector circuits OS.

The output from the third head H3 is applied to three gates G44, G45, and G46 and to a staticisor FS which in combination accept the function digit signals 41 to 48.

Of these digit signals, digit signal 41 is passed by the gate G46 controlled by P3 pulses to a stop trigger S which produces a stop output S; digit signal 42 is passed by the gate G44 controlled by P4 pulses to a trigger Y which produces the Y output which is passed as shown in FIGURE 1 to the register selector RS; while digit signal 48 is passed by the gate G44 controlled by P10 pulses to a trigger X which produces an X output which is applied to various gates such as GR, GH and GL to regulate transfers either to or from the temporary storage system.

The remaining function digit signals 43–47 which are read out by the head H3 during digit periods 5–9 are accepted by a function staticisor FS which sets up a function tree FT. The function tree FT produces 32 outputs T0–T31, which are applied to the function box FB to control its operations on number words. In addition, some of the outputs T0–T31 are applied where required to various other parts of the computer.

The manner in which the next order tag digit signals delivered by the gate G41 are used to select the next order word from the main store will now be described. The next order tag N consists of digit signals 29–36 and these signals are delivered by the gate G41 during digit periods 3 to 10. Of these eight signals, the last three are staticised by a staticisor TC which sets up a tree SC which as a result produces an output on one of eight lines which control gates such as G47 in the main store read output lines. As previously described, order words are stores on any one of eight tracks on the magnetic recording drum main store so that these three digit signals in the next order tag can specify the track on which the next order is located. As a result of the action of the tree SC, therefore, one gate G47 is opened to admit the output from one main store track to a gate G49, which is the input gate to the control register DLC. EP pulses are produced in a manner which will be described later, to open the gate G49 when the required next order word is available to be read out from the selected main store track and to cancel the previous order word from the store DLC by closing a gate G50 in its circulation loop.

The first five digit signals of the next order tag which are passed by the gate G41 during digit period 3–7 are passed by the gate G43 controlled by TMI pulses to a not-equivalent gate E3 in which they are compared with the marker pulses from the main store which identify the individual storage positions on the main store tracks. A trigger NR, which is put on at the beginning of each minor cycle by a P1 pulse, is put off by an output from the gate E3 so that only if there is complete equivalence between the marker pulses and the storage position pulses, in the next order tag, is the trigger NR still on after digit period 7. The inverted output from the trigger NR which will be referred to as NR is thus only off after digit period 7 in any minor cycle when the required order word in the main store is available to be read out.

The control of the computer is organized so that apart from certain special additional conditions, an order word is not obeyed in any case until firstly, the temporary storage system is ready to immediately deliver or receive a number word as required by the order, and secondly, the next order word is available to be delivered immediately to the control register. The first condition is satisfied when the tag not found TNF output is off after digit period 15 and the second when the NR output is off after digit period 7 as just described. These conditions are imposed by providing a gate G with an inhibiting connection to which the NR output is applied and another inhibiting connection to which the TNF output is applied. P16 pulses are applied to the gate G which thus during digit period 16 produces, unless there are any additional conditions in force, an output when the next order word is available and the temporary storage system is ready. This output from the gate G is applied to a trigger E whose output EP as shown in FIGURE 5(*e*) is the transfer timing pulse used in various parts of the computer to permit the current order word to be obeyed. It is normally terminated by an EPE pulse as shown in FIGURE 5(*f*) which is generated by a gate G54 as shown in FIGURE 4.

As shown in FIGURE 4 two other inhibiting connections are made to the gate G which are active under special conditions. The first connection conveys the stop output S from the trigger S which is used to stop the computer operating when the stop digit signal S is on. This S output may also be imposed by a manual stop switch. The other connection applies an inhibiting pulse generated by the trigger F as shown for the remainder of the minor cycle following a transfer through a gate G51 when it is opened by either a T29 or T30 output from the function tree FT. The functions T29 and T30 are concerned with the transfer of number words complete with their tags in one step between the temporary stores and the register R1 for the purpose of feeding new number words to the computer or for reading number words from the computer. For example, when the function F30 is specified the normal address tag A line from the control register CR is inhibited and the tag from the register R1 is substituted. The inhibition of the gate G for the rest of the minor cycle after the termination of the EP output is arranged in these circumstances in case the TNF output should go off before the new address is substituted.

Various other inhibiting connections may be applied to the gate G to modify the action of the computer if required. Also the EP output may be modified in various ways. One such special modification of the EP output is required when a multiplication or division operation takes place and this modification is effected by the circuits involving a trigger Q and an inhibiting gate U which is connected in the EP output path from the trigger E. As shown in FIGURE 5(*e*) the EP output normally goes off within a minor cycle so that its termination and hence the production of an EPE pulse must be specially delayed when a multiplication or division operation takes place.

The multiplication or division operation carried out by the computer is a multiplication or division of two 32 digit words which retains only the 32 most significant digits of the product and takes 33 minor cycles. The EP output is arranged to last for 33 minor cycles when an output from the function T10 or T11 signifies that a multiplication or division operation is to take place in the following manner. The trigger Q is put on by a P15 pulse which is permitted to pass through a gate G52 controlled by the T10 and T11 outputs. This P15 pulse occurs prior to the P16 pulse which puts the trigger E on with the result that the output of the trigger Q, which is applied as shown to an inhibiting connection on a gate U in the EP output path from the trigger E, closes this output path and no EP output is produced when the trigger E is put on. During digit period 2 of the next minor cycle, the trigger E puts the trigger Q off through a gate G53 as shown and so the trigger Q no longer keeps the gate U closed.

The gate U is, however, still kept closed by the output NR from the trigger NR as the output NR, which was off for the previous minor cycle when the trigger E was put on, is now on again as the main store marker output is now different from the next order tag. The main store marker output will remain different for a whole revolution of the magnetic recording drum, that is for 32 minor cycles, until the marker enabled the trigger E to go on during the previous revolution is again in position. The output NR now once again being off the EP output from the trigger E, which has been on for a whole revolution can pass through the gate U for the remainder of a minor cycle following digit period 15 and as a result an EPE pulse is produced after the multiplication or division operation has lasted for 33 minor cycles.

It will be appreciated that the rate at which the computer operates is effected by the time taken for the next order word to be found and the time taken for the operand to be found. The time taken for the operand to be found cannot be controlled by the person operating the computer and will be one minor cycle if it is found in a temporary store or more otherwise. In these circumstances, the order words are arranged in sequential order round a storage track on the main store so that there is no unnecessary delay if the operand is found in a temporary store.

By withdrawing sections of the order words from the control register delay line DLC at different positions H1, H2 and H3 as shown in FIGURE 4, these sections are all withdrawn during the early part of a minor cycle before digit period 15. As a result, the control circuits are normally set up in time to enable the number digit signals to be acted on during the same minor cycle after digit period 15. Also, P pulses P1 to P16 are sufficient to control the computer, there being no requirement for similar P pulses P17 to P48.

Various modifications of the arrangement of the computer described with reference to the drawings are possible. For example, the temporary stores may be located around a single additional storage track on the magnetic recording drum used as the main store of the computer. The temporary stores are equispaced around the track so that by means of a writing and reading head provided for each temporary store the contents of all these stores are examined simultaneously during one minor cycle as in the arrangement previously described with reference to the drawings. It is convenient of course for the temporary stores provided to fully occupy the track and in this case the number of temporary stores is equal to the number of minor cycles during one revolution of the storage drum.

A modification of the arrangement described with reference to the drawings which would shorten the average time taken by the storage arrangements to produce a required number word consists of replacing the sequencer S by a control circuit which takes into account the number of times a number word has been recently called for and selects a number word for transfer to the main store which has not been recently in demand. For example, a record may be kept of the last occasion that each number word in the temporary store has been called for, and the number word which has been unused for the longest time chosen to be no longer retained. Alternatively, the number of times each number word has been called for during the last preceding standard period may be recorded and the least used number word no longer retained.

A digital computer in accordance with the invention having a temporary store and a free-interchange main store in which number words can be stored in any location may be in the following form. The temporary store is a group of $n$ immediate access delay line stores of the type TS1 to TS10 described with reference to FIGURE 3 of the drawings and the main store is a group of $n$ high capacity delay line stores, each storing a group of words which become available for reading in a regular repetitive cyclic sequence. Each high capacity store is connected to an associated immediate access store. Then in the manner already described with reference to FIGURE 3 the tag of the required word is sought for simultaneously through all the delay line stores in the temporary store and if the tag is not found then the tag not found output TNF is used to connect the output of the associated high capacity stores in place of that of the temporary store to the tag comparing circuits of each temporary store comprising the gate GT, the non-equivalent gate E1, and the trigger circuit N as shown in FIGURE 3 in the store TS1. This connection may be carried out by providing an additional inhibiting gate in the lead from the delay line DL1 to the gate GT of each temporary store such as TS1 and a lead from an associated high capacity delay line through an end gate to the gate GT. Both this end gate and the additional inhibiting gate are controlled by the tag not found output TNF so that when the TNF output is off the delay line DL1 feeds the gate GT while when the TNF output is on the high capacity delay line is connected to the gate GT.

This arrangement enables all the high capacity stores to be examined simultaneously without using any extensive circuit arrangements in addition to those already provided in each temporary store. When the required number word is found, the temporary store circuits connected to the high capacity store in which the number word has been found operate as previously described, when the required number word is found in the temporary store itself, to transfer the number word to the function box FB. As soon as the transfer is concluded the tag not found output TNF goes off as previously described and the high capacity stores are disconnected and the circuits restored to their original condition.

What is claimed is:

1. An electronic digital computer comprising an instruction control circuit which controls the computing operation of the computer by means of instruction words, a plurality of word stores in which number words and instruction words are stored and to and from which they are transferred as steps in the computing operation under the direction of an instruction word manifestation controlling the instruction control circuit, each number word having incorporated therein a tag group of digits which is a tag identifying the word and a separate number group of digits forming a number and each instruction word having instruction-bearing digits including a tag-defining group which is the tag of another word, means for simultaneously comparing a signal of said tag-defining group of the present instruction word with the corresponding signals of the tags of words in the word stores until the tag of a stored word is compared which is equivalent to the said tag-defining group of the present instruction word, and gating means connected to the word stores and to the comparison means and controlled by said instruction control circuit for transferring this compared stored word out of said storage and means for receiving said stored word and controlled by said instruction bearing digits for operating upon this stored word in accordance with the requirements of said instruction-bearing digits of the present instruction word.

2. An electronic digital computer according to claim 1 and which operates in the serial mode and in which the said tag group of a number word occurs during a first part of the word and precedes the number group which occurs after the first part.

3. An electronic digital computer comprising an instruction control circuit which controls the computing operation of the computer by means of instruction words, a store in which a present instruction word is stored, a means controlled by said instruction word for controlling said instruction control circuit, a temporary storage device which consists of a plurality of temporary word stores in which words are stored, a main storage device which consists of a plurality of main stores in which words are stored, each word being one of two types called number words and instruction words, a number word having incorporated therein a tag group of digits which form a tag identifying the word and a second group of digits forming a number while an instruction word has incorporated therein a tag-defining group of digits which is the tag of a particular number word, means for comparing the tag group of all the words in the temporary storage device with the tag-defining group of the present instruction word and means controlled by said comparing means and said instruction control circuit for operating upon a word whose tag group is equivalent to the tag-defining group of the present instruction word in accordance with the requirements of the instruction word, means for producing a tag not found output during and only during a period that no equivalence is found between the tag-defining group of the present instruction word and the tag group of any words in the temporary storage device, means for transferring the word in a given temporary store to a main store under control of said tag not found output, and means controlled by said tag not found output for comparing the tag group of words in the main storage device with the tag-defining group of the present instruction word and for transferring to the given temporary store the word in the main store under control of said comparing means upon ascertainment of a group equivalency tag.

4. A data handling system comprising an instruction control circuit which controls the operation of the system by means of instruction words, a plurality of word store locations in which number words are stored and to and from which they are transferred as steps in the handling operation under the direction of an instruction control circuit, each number word having incorporated therein a digital tag which is a tag identifying the word and a separate number, an instruction word having an instruction-bearing digit comprising a tag of another word, means for comparing a signal of a tag of an instruction word simultaneously with corresponding in time signals of the tags of words in all the word stores until the tag of a stored word is compared which is equivalent to the said tag of the instruction word, and gating means connected to the word stores and to the comparison means for transferring this stored word under control of said comparison means.

5. An electronic data handling system according to claim 4 and having a write and read gate to render access to each word store location through which words can be respectively written into and read out from the store, a tag comparison circuit, means for feeding said tag of the word in a store to the tag comparison circuit, means for feeding the tag of the instruction word to said tag comparison circuit, means for producing an output from the tag comparison circuit when the number tag and instruction tag applied to the store tag comparison circuit are identical, and means for applying the output from the tag comparison circuit to a gate to open the gate.

6. An electronic digital computer according to claim 5 and in which a group of word stores form a temporary storage device and means for applying to the tag comparison circuit of each store in the temporary storage device the tag of the instruction word, and means for producing an output from any tag comparison circuit, when the number tag and the instruction tag are identical.

7. An electric digital computer of the general purpose stored programme kind wherein at least part of the temporary stores system as hereinbefore defined includes means for simultaneously sensing parts of the contents of all the word locations in said part of the store, means for comparing a reference word with all of the contents of those sensed parts, means for writing in and for reading out information words to and from the remaining parts of the word locations, and means controlled by the comparing means for selecting the writing and reading means for the words location for which the sensed part agrees with the reference word.

8. In an information storage system, a plurality of information storage locations, means for entering information in said storage locations, exit means for each storage location for gating information to a receiving device, a data holding device, and means for selecting a location for readout on the basis of comparison of at least a portion of its information content with data in said data holding device, said last-named means comprising separate comparison means associated with each storage location for comparing at least part of the contents thereof with data in said data holding device and providing an identity indication upon favorable comparison, and means associated with each storage location to operate the associated exit means in response to said identity indication.

9. An electric digital computer including addressable data storage means, means controlled in accordance with an address manifestation to select a desired address in said data storing means, said data including an identifying portion and an information portion, means for comparing said identifying portion with a standard, representative of desired stored data and thus identifying the desired stored data in accordance with its identifying portion, and means controlled by a manifestation of an identifying portion for operating said address manifestation controlled means and said identifying means.

10. An electric digital computer according to claim 7 and wherein the means for comparing the reference word includes as many comparing circuits as there are word locations, the circuits being supplied with the appropriate parts of the digital contents of the said locations.

11. An electric digital computer according to claim 10 wherein the means for writing in and reading out the said information words include circuits controlled from the respective outputs of the said comparing circuits for the respective reading or writing of information in that part of a location in the said store which is associated with that part of the location for which the said identity has been detected by the said word comparing means.

12. A switching device for producing an output signal on one of a plurality of output leads according to the binary representation of an input code of bits of information, said device comprising: a plurality of storage elements arranged in rows and similar bits of information arranged in time-defined columns, said rows corresponding in number to the number of said output leads and said time-defined columns corresponding in number to the number of binary digits in said input code; interrogation signal generator means for producing interrogation signals corresponding respectively to the binary digits of said input code; means for applying each interrogation signal produced by said signal generator to all of the storage element bits in a corresponding time-defined column of said storage elements, means in circuit connection with each storage element for interpreting the signal received from said signal generator means and the state of the corresponding storage element to produce an output signal indicating the comparison therebetween; and output means to produce said output signals, each output signal representing the result of all comparison performed along a corresponding row.

13. A search device for simultaneously interrogating an array of storage means to detect the presence of a predetermined pattern of bits of information therein, the array of storage means being arranged in rows, each row representing a unit of information, said searching device comprising: interrogation signal generator means adapted to produce a plurality of interrogation signals in accordance with said predetermined pattern, each interrogation signal corresponding to a respective bit of said predetermined pattern, and means for applying each interrogation signal to each storage means of the array; a plurality of comparators coupled to corresponding storage means, each comparator adapted to produce a comparison signal indicating the identity or non-identity of a pattern stored in a corresponding storage means with respect to the interrogation signal applied thereto; a plurality of output circuits, one coupled to each comparator in a corresponding row of the array, and each output circuit adapted to produce an output signal indicating the presence or absence of said predetermined pattern in the corresponding row when the array is interrogated by said interrogation signals.

14. A switching device for producing an output signal on one of a plurality of output leads according to the binary representation of an input code of bits of information, said device comprising: a plurality of storage means arranged in rows and the bits of the rows located in time-defined columnar fashion, said rows corresponding in number to the number of said output leads, and said bits arranged in said columnar fashion corresponding in number to the number of binary bits in said input code; interrogation signal generator means for producing interrogation signals corresponding respectively to the binary bits of said input code; means for applying an interrogation signal produced by said signal generator to the corresponding bits arranged in said columnar fashion, means in circuit connection with each storage means for interpreting the signal received from said signal generator means and the state of the corresponding storage bit to produce an output signal indicating the comparison therebetween; and output means for combining the respective outputs representative of a row of bits to produce said output signals, each output signal representing the result of all comparisons performed along a corresponding row of bits.

15. A search device for interrogating an array of storage means to detect the presence of a predetermined pattern of bits of information therein, the array of storage means being arranged in rows and the bits of the rows arranged in time-defined columnar fashion, each row representing a unit of information and said bits arranged in said columnar fashion representing the same correspondingly timed bit for every row, said searching device comprising: interrogation signal generator means adapted to produce a plurality of interrogation signals in accordance with said predetermined pattern, each interrogation signal corresponding to a respective bit of said predetermined pattern, and means for applying an interrogation signal to the corresponding bits of one of said time-defined columns of the array; a plurality of comparators coupled to corresponding storage means; each comparator adapted to produce a comparison signal indicating the identity or non-identity of a bit stored in a corresponding storage means with respect to the interrogation signal applied thereto; a plurality of output circuits, one coupled to each comparator in a corresponding row of the array, and each output circuit adapted to produce an output signal indicating the presence or absence of said predetermined pattern in the corresponding row when the array is interrogated by said interrogation signals.

16. An electric digital computer comprising an instruction control circuit which controls the computing operation of the computer by means of instruction words, a plurality of word stores in which number words and instruction words are stored and to and from which they are transferred as steps in the computing operation under the direction of an instruction word manifestation controlling the instruction control circuit, each number word having incorporated therein a tag group of digits which is a tag identifying the word and a separate number group of digits forming a number and each instruction word having instruction-bearing digits including a tag-defining group which is the tag of another word, means for comparing the said tag-defining group of the present instruction word with the tags of the words in the word stores until the tag of a stored word is compared which is equivalent to the said tag-defining group of he present instruction word, gating means connected to the word stores and to the comparison means and controlled by said instruction control circuit for transferring out of said storage this stored word and means for receiving said stored word and controlled by said instruction bearing digits for operating upon this stored word in accordance wth the requirements of said instruction-bearing digits of the present instruction word, said tag-defining group of said instruction word being compared with the tags of the words in said stores by simultaneously comparing a signal of said tag-defining group of said instruction word with corresponding in time signals of the tags of the words in said stores.

17. An electronic digital computer comprising an instruction control circuit which controls the computing operation of the computer by means of instruction words, a store in which the present instruction word is stored, means controlled by said instruction word for controlling said instruction control circuit, a temporary storage device which consists of a plurality of temporary word stores in which words are stored, a main storage device which consists of a plurality of main stores in which words are stored, each word being one of two types called number words and instruction words, respectively, a number word having incorporated therein a tag group of digits, which form a tag identifying the word and a second group of digits forming a number, while an instruction word has incorporated therein a tag-defining group of digits which is the tag of a particular number word, means for comparing the tag group of all the words in the temporary storage device with the tag-defining group of the present instruction word and means controlled by said comparing means and said instruction control circuit for operating upon a word whose tag group is equivalent to the tag-defining group of the present instruction word in accordance with the requirements of the instruction word, means for producing a tag not found output during and only during a period that no equivalence is found between the tag-defining group of the present instruction word and the tag group of any words in the temporary storage device, means for transferring the word in a given temporary store to a main store under control of said tag not found output, and means controlled by said tag not found output for comparing the tag group of words in the main storage device with the tag-defining group of the present instruction word and for transferring to the given temporary store the word in the main store under control of said comparing means upon ascertainment of a tag group equivalency.

18. Data handling apparatus comprising a call store, a plurality of serial access stores each storing a word, each said serial store word having a reference signal portion and an identification code signal portion, an input device, means responsive to input information for storing in said call store a call signal including at least an identification code signal, a reading device for each said serial store for scanning successive portions of its associated serial access store word to derive identification code signals therefrom, comparison means for comparing each identification code signal portion derived by said reading device from its serial store with said identification code signal, said comparison means providing a gating signal in response to a desired relationship between the identification code signal portion derived from its serial access store and said code signal from said call store, and means responsive to a gating signal from said comparison means for providing access to the reference signal portion of said words in said serial access stores.

19. A device as in claim 18, comprising an output device and means responsive to a gating signal from said comparison means to connect said serial store to said output device.

20. A device as in claim 18, said comparison means comprising comparison devices, one each associated with each serial access storage device.

21. Data handling apparatus comprising call store means and a plurality of serial access store means, one of said store means including storage means for a plurality of identification code signals and the others providing means for storing desired units of data information, one identification signal being associated with each such desired unit, a reading device for each of said serial access store means for scanning said serial access store means to derive identification code signals, each associated with a desired unit of data information, comparison means for comparing each identification code signal, so derived, with code signals from said call store means, said comparison means providing a gating signal in response to a desired relationship between said compared signals, and means responsive to a gating signal from said comparison means for providing access to the desired unit of data information associated with its identification signal so compared.

22. A device, as in claim 21, comprising an output device and means responsive to a gating signal from said comparison means to connect said serial store to said output means.

23. A device as in claim 21, said comparison means comprising comparison devices, one each, for each of said plurality of serial access store means.

24. A storage device suitable for electrical data handling apparatus comprising storage elements for storing data, means for applying electrical data signals to said elements to store representations of said signals, means for applying read-out signals to said elements tending to reproduce data signals from said elements, a plurality of destinations for reproduced signals, means for applying data signals reproduced from one of said storage elements to one of said destinations, and means responsive to data signals reproduced from another of said storage elements for selectively conditioning said destinations to accept applied signals.

25. A storage device suitable for electrical data handling apparatus comprising storage elements for storing data, said storage elements being arranged in a group, means for applying electrical data signals to said elements to store representations of said signals, read-out means for applying read-out signals selectively to the group of said storage elements, the read-out signals being applied in pre-arranged order to storage elements in the selected group, and means responsive to predetermined signals stored in some storage element in said groups for conditioning said read-out means to omit the application of read signals to a predetermined part of the group.

26. An associative memory system comprising storage means for storing words in the form of tag digits identifying each word and data digits associated with each word, individual read-out circuits associated with each of said words, latching means for establishing a read-out path for the data digits of said words through said associated individual read-out circuits, means to introduce argument tag digits to said storage means to compare said argument tag digits with the tag digits of each of said stored words, means responsive to a match between said argument tag digits and the tag digits of one of said stored words causing said latching means to establish a read-out path for the data digits associated with said one word through the read-out circuit associated with said one word.

27. A data processing machine comprising a storage device having a plurality of signal storage registers, each storage register being capable of storing data signals and associated tag signals, means for randomly storing data signals and associated tag signals in said signal storage registers, said tag signals being individually recognizable, a receiving device, and a control means including means for simultaneously reading an intelligence signal of each of said registers for recognizing individually each tag signal and, upon recognition of one of said tag signals, causing an associated data signal to be delivered to said receiving device.

28. A data processing machine comprising a storage device having a plurality of signal storage registers each being capable of storing digital signals and associated tag signals, means for randomly storing data signals and associated tag signals in said signal storage registers, a receiving device, comparing means for each storage register to compare predetermined signals with said associated tags and to produce control signals when there is a predetermined relationship between the predetermined signals and said tag signals, means for causing said tag signals to be delivered to said comparing means and means for causing said digital signals to be delivered to said receiving device upon receipt of said control signals.

29. Storage equipment for electrical intelligence comprising a number of stores each capable of storing a related set of intelligence signals including an identification signal, means for randomly storing intelligence signals including an identification signal in said stores, reading means associated with said stores for simultaneously scanning an intelligence signal of each of said stores, means independent of said stores for producing control signals, and a comparator connected to said reading means and said control signal producing means for comparing said identification signal with said control signals to determine whether there is a predetermined relation between said identification signals and said control signals.

30. A data processing machine comprising a storage device having a plurality of signal storage registers, each storage register being capable of storing instruction signals and associated tag signals, means for randomly storing said instruction signals and associated tag signals in said storage registers, said tag signals being individually recognizable, a receiving device and a control means including means for scanning all said registers for recognizing individually each tag signal and, upon recognition of one of said tag signals, causing an associated instruction signal to be delivered to said receiving device.

31. An associative memory system comprising a plurality of storage means for storing instruction words in the form of tag digits identifying each word and instruction indicating digits associated therewith, individual read-out circuits associated with each of said storage means, said read-out means individually controlled by identifying means for establishing a read-out path therethrough, means to introduce argument tag digits to said identifying means to compare said arguments tag digits with the tag digits of each of said stored words, one of said read-out circuits being thus responsive to a match between said argument tag digits and the tag digits of one of said stored words to establish a read-out path for the instruction indicating digits associated with said one word.

32. In a data processing system, apparatus comprising storage means having a plurality of storage locations, each location storing signals representing a unit of information, selecting means for conditioning said storage means to store signals representing units of data in said storage locations, and each storage location having a retrieval means for examining signals of a selected portion of the units of information and extracting signals representing a unit of informaton from said storage means on the basis of the content of the selected portion of the examined units of information.

33. In an information storage system, a plurality of information storage registers, a temporary storage device, means including a separate entry control means for each storage register for transferring information thereto, means including separate exit control means for each storage register for gating information to a receiving device, and means for selecting one of said storage registers for read-out on the basis of comparison of at least a portion of its information content with data in said temporary storage device, said last-named means including separate comparison means associated with each of said storage registers for comparing said portion of the contents thereof with the contents of said temporary storage device and providing an identity indication upon favorable comparison, and means associated with each storage register to operate the associated exit control means in response to said identity indication.

34. In an information storage system, a plurality of information storage locations, means for entering information in said storage locations, exit means for each storage location for gating information to a receiving device, a data holding device, and means for selecting a location among said storage locations for read-out on the basis of comparison of at least a portion of its information content with data in said data holding device, said last-named means comprising separate comparison means associated with each storage location for comparing at least part of the content thereof with data in said data holding device and providing an identity indication upon favorable comparison and means associated with each storage location to operate the associated exit means in response to said identity indication.

35. Apparatus for the storage of information comprising a plurality of locations each capable of storing information signals including identification signals, separate information reading means associated with each different location, means for examining the identification signals from all locations and control means conditioned by said identification signal examining means for selectively operating the information reading means.

References Cited by the Examiner

UNITED STATES PATENTS

| | | | |
|---|---|---|---|
| 2,580,768 | 1/1952 | Hamilton et al. | 235—61 |
| 2,679,638 | 5/1954 | Bensky et al. | 235—61 |
| 2,721,990 | 10/1955 | McNaney | 235—61 |
| 2,755,994 | 7/1956 | Williams et al. | 235—61 |
| 2,771,595 | 11/1956 | Hendrickson et al. | 235—61 |

OTHER REFERENCES

Gluck, The Electronic Discrete Variable Computer, Electrical Engineering, February 1953, pages 159 to 162 235/61.

Greewald et al.: SEAC, Proceedings of The I.R.E., October 1953, pages 1300 to 1312.

ROBERT C. BAILEY, *Primary Examiner.*

L. SMILOW, L. M. ANDRUS, *Examiners.*

G. SADOWSKY, D. TESCHNER, I. S. KAVRUKOV, *Assistant Examiners.*